United States Patent [19]

Muller et al.

[11] Patent Number: 5,724,144
[45] Date of Patent: Mar. 3, 1998

[54] PROCESS MONITORING AND THICKNESS MEASUREMENT FROM THE BACK SIDE OF A SEMICONDUCTOR BODY

[75] Inventors: Karl Paul Ludwig Muller, Wappingers Falls; Katsuya Okumura, Poughkeepsie; Theodore G. Van Kessel, Millbrook, all of N.Y.

[73] Assignees: International Business Machines Corp., Armonk, N.Y.; Kabushiki Kaisha Toshiba, Kanagawa-ken, Japan

[21] Appl. No.: 674,855

[22] Filed: Jul. 3, 1996

Related U.S. Application Data

[63] Continuation of Ser. No. 388,412, Feb. 14, 1995, abandoned.
[51] Int. Cl.⁶ .................................................. G01B 11/06
[52] U.S. Cl. .................................................. 356/382
[58] Field of Search ............................. 356/355, 357, 356/381, 382

[56] References Cited

U.S. PATENT DOCUMENTS

| | | |
|---|---|---|
| 3,804,532 | 4/1974 | Patten et al. . |
| 4,498,772 | 2/1985 | Jastrzebski et al. . |
| 4,555,767 | 11/1985 | Case et al. . |
| 4,618,261 | 10/1986 | Flanders et al. . |
| 4,660,979 | 4/1987 | Muething . |
| 4,773,760 | 9/1988 | Makkonen . |
| 4,908,508 | 3/1990 | Dubbledam . |
| 4,984,894 | 1/1991 | Kondo ................................ 356/355 |
| 5,046,849 | 9/1991 | Severin et al. ................... 356/355 |
| 5,081,796 | 1/1992 | Schultz ............................. 451/63 |
| 5,100,233 | 3/1992 | Southwell et al. . |
| 5,220,405 | 6/1993 | Barbee et al. . |
| 5,240,552 | 8/1993 | Yu et al. . |

*Primary Examiner*—Frank G. Font
*Assistant Examiner*—Amanda Merlino
*Attorney, Agent, or Firm*—Banner & Witcoff, Ltd

[57] ABSTRACT

The processing of a semiconductor body front side surface can be monitored in-situ, and thickness data for a body can be obtained ex-situ, by directing an infrared beam at the back side surface of the body. The light is reflected from front and back sides of a body portion to form primary and secondary reflections which are detected. An interference signal representative of interference fringes of the primary and secondary reflections is generated, and thickness data for the body or a body portion is calculated from the interference signal. In-situ monitoring of processes such as mechanical-chemical polishing, chemical vapor deposition, and plasma or reactive ion etching is achieved by providing a light passageway through a semiconductor body support such as a chuck or electrode, e.g., a cathode. In this manner, the process monitoring does not hinder, and is not hindered by, the processing steps and equipment.

36 Claims, 3 Drawing Sheets

PROCESS MONITORING AND THICKNESS MEASUREMENT FROM THE BACK SIDE OF A SEMICONDUCTOR BODY

This application is a continuation of application Ser. No. 08/388,412, filed Feb. 14, 1995 now abandoned.

BACKGROUND OF THE INVENTION

The invention relates generally to the measurement of semiconductor bodies. More specifically, the invention concerns the in-situ monitoring of semiconductor fabrication processes, as well as the ex-situ measurement of semiconductor layers/portions.

Semiconductor device fabrication techniques include a number of different processes which form material on a semiconductor body. For example, various films may be formed on the semiconductor body using chemical vapor deposition (CVD). CVD and other deposition techniques are generally performed in a reaction chamber, at controlled temperatures and pressures, or in another closed environment. The deposited films may function in the final semiconductor device as either semiconductors, insulators, dielectrics, or conductors. Alternatively, the deposited films may be used as part of an intermediate processing step.

In addition, many semiconductor device fabrication techniques cause material to be removed from the semiconductor body. Material may be removed from the semiconductor body through mechanical processes, chemical processes, or a combination of chemical and mechanical processes. For example, in some planarization processes, surface material of the semiconductor body is removed from the semiconductor body to remove surface defects and impurities and to achieve a uniform topography for later processing. Moreover, material may be removed from selected portions of the semiconductor body to form trenches therein. Trenches may be formed, for example, by ion milling, reactive ion etching (RIE), or plasma etching while the semiconductor body is in a reaction chamber under controlled conditions. The resulting trenches may be filled to form semiconductor devices or to isolate neighboring semiconductor devices.

In many cases, the amount of material deposited or removed is critical to the semiconductor device fabrication process. Accordingly, it is necessary to carefully control the processes which deposit a layer of material and which remove material. In some circumstances, the thickness of a deposited film, the thickness of a layer remaining after planarization, or the depth of a trench, for example, may be approximated by controlling process parameters such as time, concentration, temperature, and pressure, for example. However, the degree of control afforded by these techniques is insufficient to meet the relatively tight fabrication specifications of modern semiconductor devices. Further, it is difficult to duplicate these process parameters over several production cycles so that uniform semiconductor devices are fabricated.

Several techniques have been attempted to address the problem by monitoring deposition, etching, and polishing using interferometers. U.S. Pat. No. 5,220,405 to Barbee et al. discloses in-situ monitoring of the thicknesses of a process surface of a semiconductor substrate undergoing etching or deposition. A first light beam from an interferometer is reflected from the process surface of the semiconductor substrate. A phase difference between the reflected first light beam and a second light beam reflected internally in the interferometer is measured thereby providing an indication of the change in distance between the process surface and the interferometer. A second interferometer identical to the first interferometer may be positioned at the back side of the semiconductor substrate, opposite to the process surface, to measure the distance between the second interferometer and the back side surface of the semiconductor substrate. The output from the second interferometer is combined with the output of the first interferometer to compensate for movement of the semiconductor substrate. Accordingly, the change in the distance between the process surface and the first interferometer, as compensated by the second interferometer measurement, is indicative of the amount of etching or deposition taking place.

U.S. Pat. No. 5,081,796 to Schultz discloses monitoring a planarization polishing process that uses a laser interferometer for measuring the thickness of an oxide film at the surface of a semiconductor substrate. A rotatable polishing head holds a semiconductor substrate over a rotatable polishing platen. The polishing platen carries a polishing slurry and a surface of the semiconductor substrate is polished by effecting relative movement between the polishing head and the polishing platen. An interferometer is positioned adjacent to the polishing platen. To measure a thickness of the oxide layer, the rotatable polishing head moves the semiconductor substrate beyond the outer perimeter of the polishing platen so as to expose the oxide layer to a light beam from the interferometer. The interferometer detects a thickness of a surface layer based upon light reflected therefrom.

The techniques described above generally involve monitoring fabrication processes from the front surface of the semiconductor substrate, where the processing is carried out. Measurements from the back side surface of the semiconductor substrate are performed, if at all, for calibration of the front surface measurements and not as a measure of the fabrication process being performed. Monitoring a fabrication process from the front of the semiconductor substrate presents several difficulties. For example, monitoring the front surface of the semiconductor substrate is difficult because the presence of mechanical devices, such as the polishing platen, tend to obstruct with the monitoring equipment. In addition, the polishing slurry affects the light impinging on the semiconductor substrate surface thereby introducing inaccuracies.

Further, processing, such as CVD, ion milling, RIE, or plasma etching, to name a few, is performed in a closed environment, such as a reaction chamber. Line of sight problems and restrictions on the location of view ports in the reaction chamber walls make in-situ monitoring from the front difficult. Accordingly, there exists a need for a process monitoring technique which overcomes the difficulties discussed above. In addition, there exists a need for a process monitoring technique that does not interfere with processing steps.

Often times it is also desirable to check the thickness dimension of a semiconductor layer/portion ex-situ, e.g., after processing. Accordingly, it would be advantageous if a process monitoring technique having the aforementioned advantages could also be used in this capacity.

SUMMARY OF THE INVENTION

In view of the above, it is a primary object of the present invention to provide a method for in-situ monitoring of the processing of a semiconductor body (e.g., chemical-mechanical polishing, chemical vapor deposition, and RIE or plasma etching), which method does not hinder, and is not hindered by, the processing steps and equipment.

It is a further object of the invention to provide a method having the advantages as indicated above and which also is generally applicable to ex-situ measurement of a semiconductor layer/portion.

Still another object of the invention is to provide a suitable apparatus for carrying out back side process monitoring.

These and other objects are achieved by the various aspects of the invention summarized below.

In a first aspect, the present invention is embodied in a method for obtaining thickness data for a semiconductor body. A semiconductor body comprising a front side portion and a back side portion is provided. Light is transmitted from a light source onto the back side portion such that the light is at least partially transmitted through the back side portion, partially reflected by a back side surface of the front side portion to form a primary reflection, and partially transmitted through the front side portion then at least partially reflected from a front side surface of said front side portion to form a secondary reflection. The primary and secondary reflections are detected and thickness data for the front side portion is calculated from the primary and secondary reflections.

In a second aspect, the invention is embodied in a method for obtaining, in-situ during processing, thickness data for a semiconductor body. A front side surface of a semiconductor body is processed. Light is transmitted from a light source onto the back side surface of the body, during the processing, such that the light is reflected from a back side of a body portion to form a primary reflection and from a front side of the body portion to form a secondary reflection. The primary and secondary reflections are detected and thickness data for the body portion is calculated from the primary and secondary reflections.

In a third aspect, the invention is embodied in an apparatus for processing a front side of a semiconductor body and providing in-situ process monitoring. A processing agent and a support platform for supporting the semiconductor body are provided such that the front side surface thereof can be processed by the processing agent. A light source is positioned relative to the body and platform such that the light source can impinge light onto a back side surface of the semiconductor body, whereby the light is reflected from a back side of a body portion to form a primary reflection and a front side of the body portion to form a secondary reflection. Detector means are provided for detecting the primary and secondary reflections, and calculating means are provided for calculating thickness data for the body portion from the primary and secondary reflections.

In accordance with the present invention, light, e.g., an infrared beam, is directed from the back side of the semiconductor body and may be used to monitor processing occurring at the front surface of the semiconductor body. Accordingly, processes which form material on the front surface of the semiconductor body or which remove material from the front surface of the semiconductor body may be monitored in-situ without interfering with the process itself. Moreover, the back side measurement technique of the invention can be performed ex-situ to confirm a thickness dimension of a processed semiconductor. Measurements taken from the back side of a semiconductor body in accordance with the present invention are used to determine directly thickness dimensions and/or dimensional changes due to processing of a front surface of the semiconductor body, not merely to calibrate measurements taken from the front surface of the semiconductor body.

A complete understanding and appreciation of the present invention and its many attendant advantages will be gained from the following detailed description of the preferred embodiments, taken in connection with the accompanying drawings.

DETAILED DESCRIPTION OF THE PREFERRED EMBODIMENTS

Figure 1:
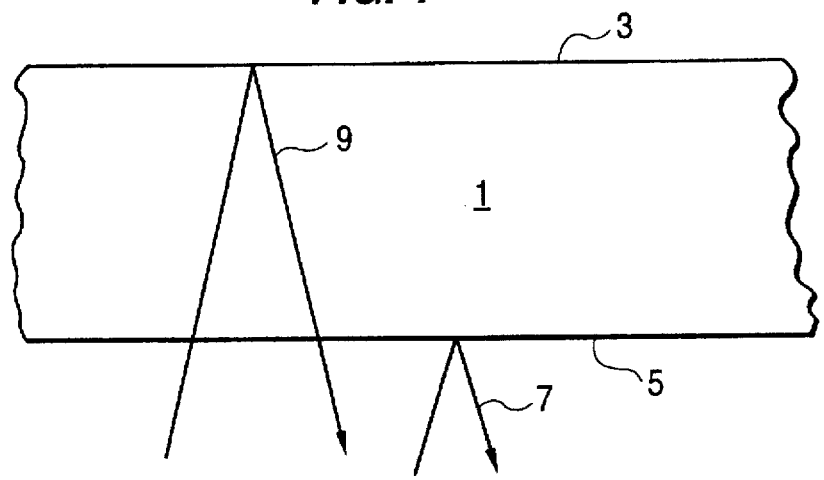
FIG. 1 is a partial cross-sectional view of a semiconductor body, diagrammatically illustrating the reflection of a light beam in a back side measurement of the thickness of the semiconductor body.
Figure 2:
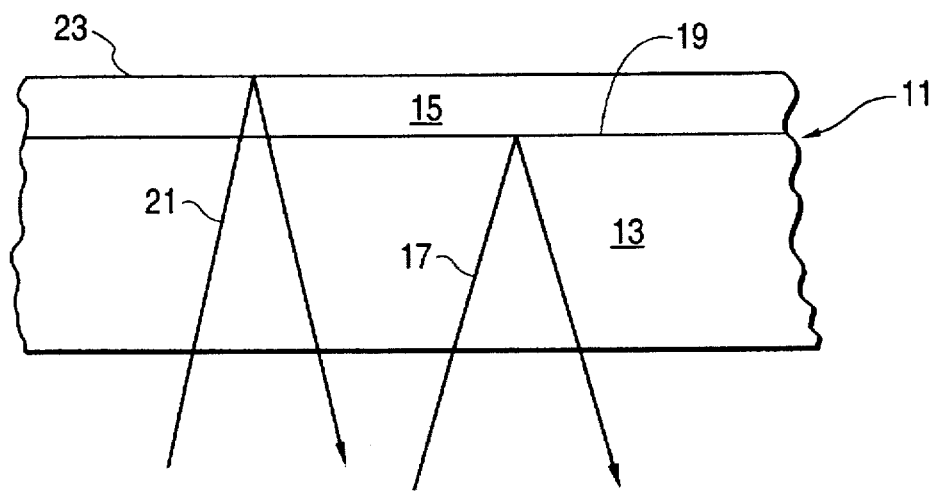
FIG. 2 is a partial cross-sectional view of a semiconductor body, diagrammatically illustrating the reflection of a light beam in a back side measurement of the thickness of a layer deposited on a bulk semiconductor material.
Figure 3:
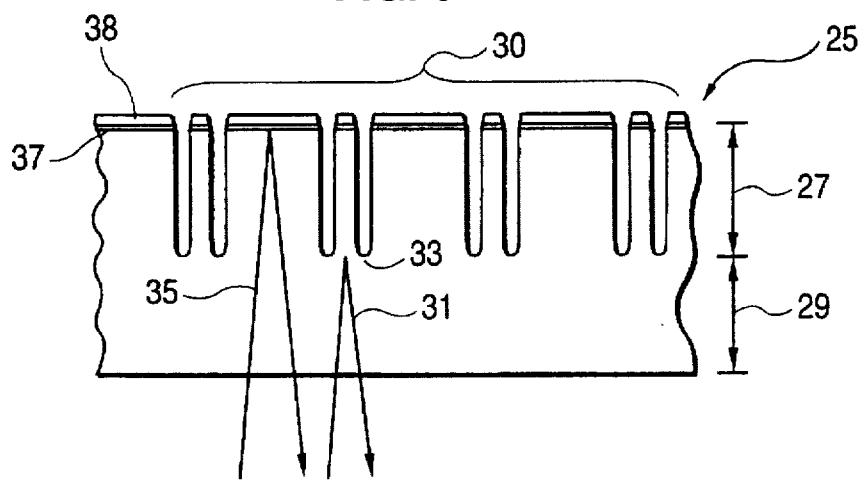
FIG. 3 is a partial cross-sectional view of a semiconductor body, diagrammatically illustrating the reflection of a light beam in a back side measurement of the thickness of a dense pattern of etched deep trenches.

FIGS. 1–3 illustrate three exemplary types of semiconductor body thickness measurements which are possible with the present invention.

In FIG. 1, the overall thickness of a semiconductor body 1 having a front side surface 3 and a back side surface 5 is measured by impinging a light beam onto back side surface 5. In the present context "semiconductor body" refers generally to bulk semiconductor substrates or wafers (with and without semiconductor devices formed therein) and to composite semiconductor bodies and chips having one or more layers.

The light beam may be produced by a variety of known means such as a IR laser diode or a tungsten halogen lamp. The primary requirements are that the light beam have a narrow bandwidth and a coherence length at least equal to the range of thicknesses to be measured. In this regard, if an overall body thickness on the order of 500 µm is to be measured, a laser light source is most appropriate due to its large coherence length. On the other hand, if a relatively thin layer is being measured on the order of a few µm, then a tungsten halogen lamp will provide an adequate coherence length. It is also necessary that the material of the semiconductor body being measured appear substantially transparent to the chosen light wavelength. Generally, a beam in the infrared range will be chosen since infrared light can readily be produced in a narrow band and will readily pass through a variety of semiconductor materials.

The light beam can be directed to the back of the semiconductor body using lenses, mirrors, beam splitters and other known optical elements. It is contemplated that the light beam could be transmitted by fiber optic for a specific wavelength and narrow bandwidth.

As diagrammatically depicted by arrow 7, a first portion of the light beam is reflected off of back side surface 5 to form a primary reflection. As depicted by arrow 9, a second portion of the beam is transmitted through body 1 then reflected off of front side surface 3 to form a secondary reflection. The primary and secondary reflections are detected by an optical detector, e.g., an indium antimonide cell or an indium arsenide cell. Since the first beam portion travels a shorter distance than the second beam portion, a phase difference is set up between the primary and secondary reflections. This results in interference fringes from which the thickness of semiconductor body 1 can be calculated using interferometric techniques described in further detail below. As used herein, the term "reflection" is intended to include detectible scattered light from which thickness data is obtainable.

In the embodiment of FIG. 1, semiconductor body 1 comprises a single layer bulk substrate material, e.g., monocrystalline Si. Typically, the thickness measurement will be performed in connection with some sort of processing of the front side surface 3. For example, it may be desired to monitor the thickness of body 1 in-situ, as the front side surface is subjected to chemical-mechanical polishing. Alternatively, it may be desired to confirm the proper thickness of the body ex-situ, following the polishing operation. In either event, the back side measurement technique of the present invention avoids the need for a clear view of the front side surface of the body. This is particularly important for in-situ process monitoring, as will be explained. (In-situ process monitoring is described in greater detail below in connection with FIGS. 4 and 5.)

Referring now to FIG. 2, a semiconductor body 11 includes a back side portion 13 comprising a bulk substrate layer and a front side portion 15 comprising a layer of different material, e.g., $SiO_2$ or $SIN_3$, deposited on bulk layer 13, such as by chemical vapor deposition (CVD). In this instance, it may be desired to measure the thickness of the deposited layer rather than the entire body. To accomplish this in accordance with the present invention, a light beam is impinged onto back side portion 13 as previously described. As depicted by arrow 17, the beam is at least partially transmitted through back side portion 13 and partially reflected by a back side surface 19 of front side portion 15 to form a primary reflection. As depicted by arrow 21, the beam is further partially transmitted through front side portion 15 then at least partially reflected by a front side surface 23 of front side portion 15 to form a secondary reflection. The reflection at the interface between the body portions is due to the difference in the index of refraction of back side portion 13 and front side portion 15. For example, for a vacuum light wavelength of approximately 2 µm, $SiO_2$ and $SiN_3$ have indices of refraction of approximately 1.5 and 2.0, respectively, whereas Si has an index of refraction of approximately 3.4.

The primary and secondary reflections are detected and the thickness of the front side portion can be calculated therefrom. Such measurement can be performed in-situ during deposition of the front side portion layer 15, or ex-situ following the deposition procedure.

Referring now to FIG. 3, a semiconductor body 25 is formed of a bulk semiconductor material, e.g., monocrystalline Si. A front side portion 27 of body 25 is differentiated from a back side portion thereof 29 by the inclusion in the former of a dense pattern of deep etched trenches 30. Such a pattern of trenches gives front side portion 27 an effective index of refraction which differs from the index of refraction of underlying back side portion 29. Thus, the depth of the trenches 30, i.e., the thickness of front side portion 27, can be measured in a manner similar to that described with respect to FIG. 2. Namely, a light beam is impinged onto back side portion 29. As depicted by arrow 31, the beam is at least partially transmitted through back side portion 29 and partially reflected by a back side surface 33 of front side portion 27 to form a primary reflection. As depicted by arrow 35, the beam is further partially transmitted through front side portion 27 then at least partially reflected by a front side surface 37 of front side portion 27 to form a secondary reflection. Layer 38 on top of front side portion 27 represents an etching pattern mask layer. The primary and secondary reflections are detected and the thickness of the front side portion can be calculated therefrom.

A dense pattern of trenches 30 assures a good signal to noise ratio. Reduced trench density will reduce the signal to noise ratio. However acceptable results should be obtainable for the trench densities typically associated with current DRAM products (4 Mb to 256 Mb). It is also preferable (although not always necessary) for the semiconductor body to have a polished back side surface in order to increase the signal to noise ratio of the signal generated by the light detector.

Figure 4:
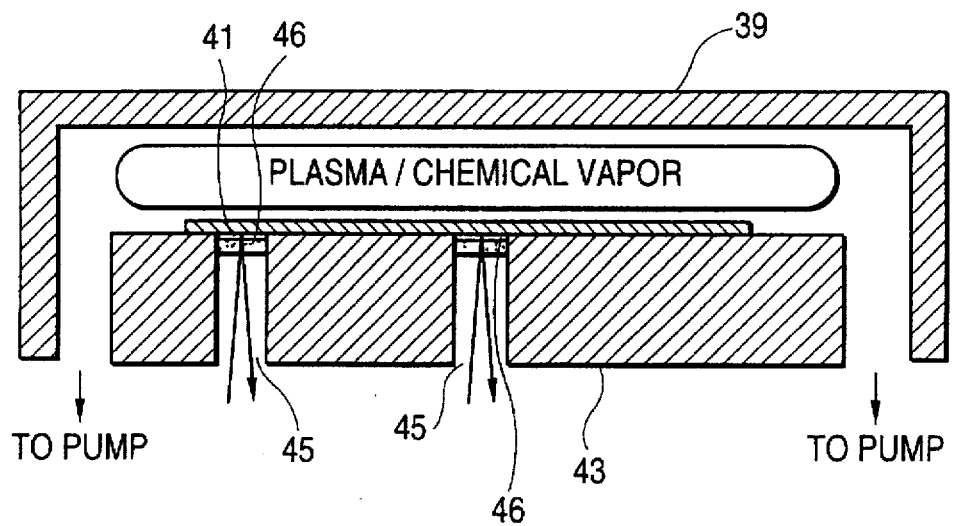
FIG. 4 is a diagrammatic cross-sectional view illustrating back side monitoring of a semi-conductor body in-situ, within a reaction chamber.

Exemplary in-situ process monitoring applications of the present invention are now described with reference to FIGS. 4 and 5. In FIG. 4, a reaction chamber 39 may be used to perform plasma or RIE etching on a front side surface of a semiconductor body 41 supported on a cathode 43 within chamber 39. On the other hand, with a chemical vapor substituted for a plasma as the processing agent, reaction chamber 39 can be used to perform CVD on the front side surface of body 41. In either event, limitations on the placement of view ports in chamber 39 makes conventional optical monitoring of the process from the front side of the semiconductor body very difficult. In accordance with the present invention, back side monitoring of the etch or CVD processing of the front side surface of semiconductor body 41 is accomplished by providing a pair of passageways bores) 45 through cathode 43 for allowing the passage of light from the light source to the back side surface of body 41, and for allowing the light reflected from body 41 to pass back out for detection, as depicted by the arrows. Bores 45 can be provided with windows 46 so as to maintain a seal of chamber 39. While adequate results can often be obtained by taking a measurement at a single central location on body 41, added measurement reliability can be obtained by providing a pair of passageways, as shown, for allowing a measurement to also be taken at an edge of the body. The light beam can be directed from the light source to the passageway 45 using lenses, mirrors, beam splitters and fiber optic, for example. The reflected light can be transmitted to the optical detector in a similar manner.

Figure 5:
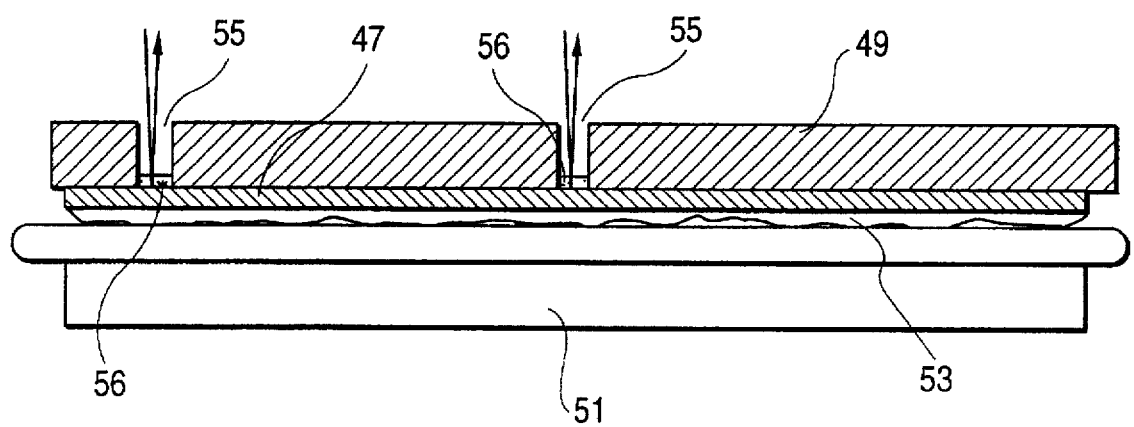
FIG. 5 is a diagrammatic cross-sectional view illustrating back side monitoring of a semiconductor body in-situ, undergoing a polishing operation.

In FIG. 5, the principles of the present invention are applied to allow for in-situ process monitoring of a chemical-mechanical polishing operation. A semiconductor body 47 is secured to a chuck 49 with the front side surface thereof exposed to allow polishing through the agency of a rotating polishing pad 51 and a polishing slurry 53. The presence of polishing pad 51 and slurry 53 makes it difficult, if not impossible, to obtain an unobstructed frontal view of body 47 for measurement purposes. This difficulty is avoided with the back side monitoring technique of the present invention. Similar to the preceding embodiment of FIG. 4, back side monitoring of the polishing at the front side surface of semiconductor body 47 is accomplished by providing a pair of passageways (bores) 55 through chuck 49 for allowing the passage of light from the light source to the back side surface of body 47, and for allowing the light reflected from body 47 to pass back out for detection.

Similar to the FIG. 4 embodiments, bores 55 can be provided with windows 56.

Particular interferometric measurement apparatus/methods usable in the practice of the present invention are now described with reference to FIGS. 6 and 7. The principles of these apparatus/methods, as applied to a front side trench depth measurement technique, are disclosed in U.S. application Ser. No. 08/125,955 (now U.S. Pat. No. 5,392,118, issued Feb. 21, 1995) entitled Method for Measuring a Trench Depth Parameter of a Material, filed Sep. 22, 1993 and assigned to IBM Corporation. This application is hereby incorporated by reference in its entirety.

Figure 6:
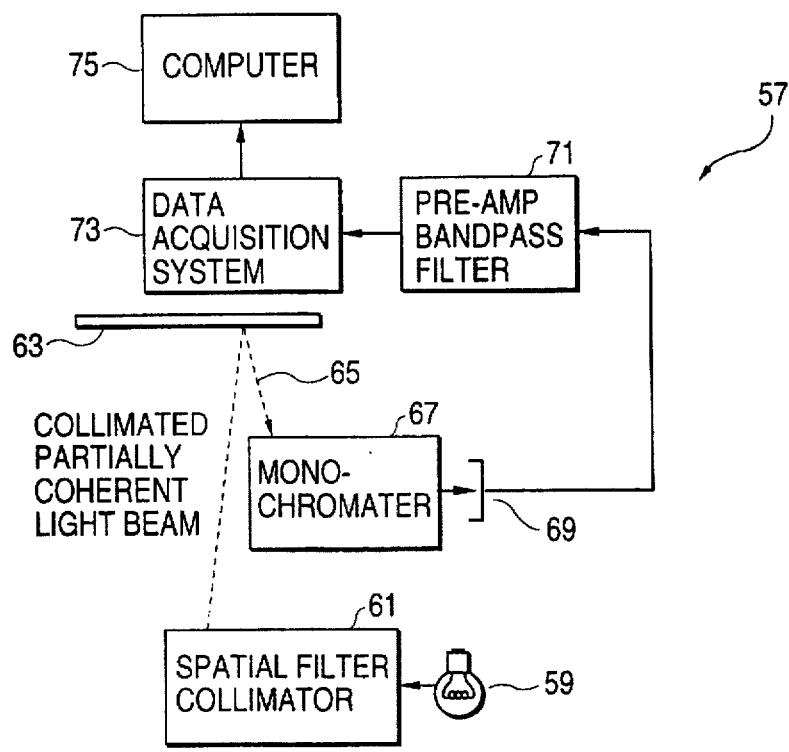
FIG. 6 is a schematic representation of a first interferometric system usable in performing a back side measurement in accordance with the present invention.

Attention is first directed to FIG. 6 which shows an assembly 57 that is suitable for realizing a mode of measurement which can be identified as wavelength tuning. In overview, the FIG. 6 wavelength tuning comprises a variable wavelength methodology, a fixed or variable trench depth and a preferred (since inexpensive, compared to a laser) utilization of a tungsten halogen light source 59. Since this methodology does not require for its operation a changing depth dimension, it is suitable for ex-situ measurement of a semiconductor body, i.e., measurement performed after the processing is completed, as well as in-situ process monitoring. The operation of assembly 57 is as follows.

Light is emitted from the source 59, and directed through a conventional spatial filter collimator 61. Preferably, the light is further directed to the backside of semiconductor body 63 by way of a mirror at normal or near normal incidence.

A scattered (or reflected) beam 65 is imaged through a conventional scanning monochrometer 67 on to a conventional detector 69 suitable to the measurement wavelength range. An electrical signal from the detector 69 is then amplified and optimally bandpass filtered to an AC signal (box 71).

The filtered signal preferably is next amplified, offset and converted to a digital form using a conventional data acquisition system 73, for subsequent storage in a computer 75.

Preferably, the digitized signal is averaged one or more times, and then digitally filtered to remove noise. The noise reduced signal is then processed to isolate peak features in the signal versus wavelength. The peak signal is then convolved with the intensity variation function cos [(4 λnd)/π] over the depth range of interest. The location maximum of the convolved signal versus depth may be interpreted as the trench depth. This signal information can be used to control the processing apparatus manually, or by computer using known closed loop feedback techniques.

Figure 7:
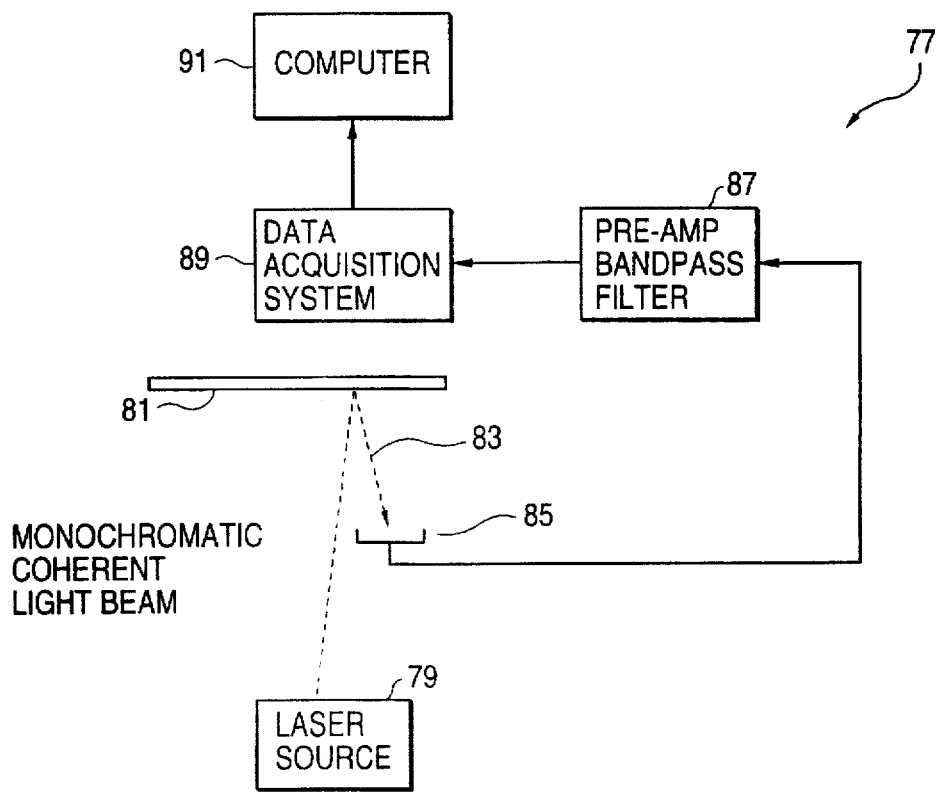
FIG. 7 is a schematic representation of a second interferometric system usable in performing a back side measurement in accordance with the present invention.

Attention is now directed to FIG. 7, which shows an assembly 77 that is suitable for realizing a mode of measurement that can be identified as depth or thickness sampling. In overview, the FIG. 7 mode comprises a fixed wavelength methodology, a variable depth or thickness variation, and a utilization of a laser source 79. This methodology relies for its operation on a changing depth dimension, such as a changing trench depth as occurs during etching, or a changing layer thickness as occurs during CVD or chemical-mechanical polishing. Accordingly, this methodology is particularly suited for in-situ process monitoring, such as described in connection with FIGS. 4 and 5. The operation of assembly 77 is described below in the context of the in-situ process monitoring of a deep trench etching process.

Monochromatic or narrow band light is emitted from the laser source 79, and preferably collimated, spatially filtered and steered to the backside of semiconductor body 81, at normal or near normal incidence.

A scattered (or reflected) beam 83 is imaged on a detector 85 suitable to the measurement wavelength. An electrical signal from the detector 85 is then amplified and optimally bandpass filtered to an AC signal (box 87).

The filtered signal preferably is then amplified, offset and converted to a digital form using a data acquisition system 89.

Preferably, the digitized signal is averaged one or more times, and then digitally filtered to remove noise. The noise reduced signal is then processed to isolate peak features in the signal as a function of time. The peaks are maxima and minima in the intensity signal. The periodicity of this intensity signal, e.g., from one maximum to the next, is $\Delta t$. Within $\Delta t$ the depth of the trenches increases by 0.5 ($\lambda/n$), wherein $\lambda$ is the vacuum wavelength of the beam and n is the index of refraction for the material to be etched. Given the known initial depth, the trench depth versus time can be computed (e.g., by computer 91) by integration. This signal information can be used to control the processing apparatus manually, or by computer using known closed loop feedback techniques.

Experimental Results: On a prototype tool corresponding to the wavelength tuning apparatus described in connection with FIG. 6, and with a wavelength variation of 2500 to 3500 nm, the following measurements were achieved in a back side trench depth measurement of 256 Mb deep trench wafers. The measurements were performed ex-situ after the etch and before HF dip. Five measurements were taken on four different chip fields. All measurements resulted in a depth of 4.9 µm. Cross sections and scanning electron microscope (SEM) analysis confirmed this depth. The SEM analysis resulted in 5.05 µm depth, a difference of only 3%.

Illustrative embodiments of the present invention have been described in detail with reference to the accompanying drawings. It is to be understood, however, that the invention is not limited to those precise embodiments. Numerous other embodiments and modifications within the scope and spirit of the invention, as defined in the appended claims, will occur to those of ordinary skill in the art upon reading this disclosure.

We claim:

1. A method for obtaining thickness data for a semiconductor body, comprising:
   providing a semiconductor body comprising a front side portion and a back side portion on a semiconductor body support platform including a passageway for transmission of light from a light source therethrough, said support platform comprising a structure selected from the group consisting of: (a) a chuck for holding the semiconductor body during polishing of a front side surface of said front side portion; and (b) a cathode within a reaction chamber;
   transmitting light from said light source through said passageway and onto said back side portion such that said light is at least partially transmitted through said back side portion, partially reflected by a back side surface of said front side portion to form a primary reflection, and partially transmitted through said front side portion then at least partially reflected from a front side surface of said front side portion to form a secondary reflection;
   detecting said primary and secondary reflections; and
   calculating thickness data for the front side portion from said primary and secondary reflections.

2. A method according to claim 1, wherein said detecting step comprises generating an interference signal representative of interference fringes of the primary and secondary reflections, and said calculating step comprises calculating thickness data of the front side portion from said interference signal.

3. A method according to claim 1, wherein said back side portion comprises a layer of Si bulk material and said front side portion comprises a layer of different material deposited on said layer of Si bulk material.

4. A method according to claim 1, wherein each of said back side and front side portions comprises Si bulk material, and said front side portion is differentiated from said back side portion by having a dense pattern of trenches etched therein.

5. A method according to claim 1, wherein said back side portion has a polished back side surface.

6. A method according to claim 1, wherein said light from the light source is an infrared beam.

7. A method according to claim 1, wherein said back side portion appears substantially transparent to said light from the light source.

8. A method according to claim 1, said method being performed in-situ during processing of the semiconductor body.

9. A method according to claim 8, wherein said processing of the front side portion comprises chemical-mechanical polishing.

10. A method according to claim 8, wherein said processing of the front side portion comprises RIE or plasma etching of the body.

11. A method according to claim 8, wherein said processing of the front side portion comprises chemical vapor deposition onto the body.

12. A method according to claim 8, wherein said detecting step comprises generating an interference signal representative of interference fringes of the primary and secondary reflections, and said calculating step comprises calculating thickness data of the front side portion based upon changes in the intensity of the interference signal as a function of time.

13. A method according to claim 1, said method being performed ex-situ after processing of the front side portion.

14. A method according to claim 13, wherein a wavelength of said light from the light source is varied, said detecting step comprises generating an interference signal representative of interference fringes of the primary and secondary reflections, and said calculating step comprises calculating thickness data of the front side portion based upon changes in the intensity of the interference signal as a function of light wavelength variations.

15. A method for obtaining, in-situ during processing, thickness data for a semiconductor body, comprising:
    processing a front side surface of a semiconductor body which is held on a semiconductor body support platform including a passageway for transmission of light from a light source therethrough, said support platform comprising a structure selected from the group consisting of: (a) a chuck for holding the semiconductor body during polishing of said front side surface; (b) a cathode within a reaction chamber;
    transmitting light from said light source onto said back side portion of the body through said passageway during said processing, such that said light is reflected from a back side of a body portion to form a primary reflection and a front side of the body portion to form a secondary reflection;
    detecting said primary and secondary reflections; and
    calculating thickness data for the front side portion from said primary and secondary reflections.

16. A method according to claim 15, wherein said front and back sides of the body portion are said front and back side surfaces.

17. A method according to claim 15, wherein said front side of the body portion is said front side surface, and said back side of the body portion is an internal surface of the body.

18. A method according to claim 15, wherein said detecting step comprises generating an interference signal representative of interference fringes of the primary and secondary reflections, and said calculating step comprises calculating said thickness data from said interference signal.

19. A method according to claim 15, wherein said light from the light source is an infrared beam.

20. A method according to claim 15, wherein said body appears substantially transparent to said light from the light source.

21. A method according to claim 15, wherein said processing of the front side surface comprises chemical-mechanical polishing.

22. A method according to claim 15, wherein said processing of the front side surface comprises RIE or plasma etching.

23. A method according to claim 15, wherein said processing of the front side surface comprises chemical vapor deposition.

24. A method according to claim 15, wherein said detecting step comprises generating an interference signal representative of interference fringes of the primary and secondary reflections, and said calculating step comprises calculating said thickness data based upon changes in the intensity of the interference signal as a function of time.

25. An apparatus for processing a front side of a semiconductor body and providing in-situ process monitoring, comprising:
    a processing agent and a support platform for supporting said semiconductor body such that said front side surface thereof can be processed by said processing agent, said support platform having a passageway for transmission of light therethrough;
    a light source positioned relative to said body and platform such that said light source can transmit light through said passageway and impinge light onto a back side surface of said semiconductor body, whereby said light is reflected from a back side of a body portion to form a primary reflection and a front side of the body portion to form a secondary reflection;
    detector means for detecting said primary and secondary reflections; and
    calculating means for calculating thickness data for the body portion from said primary and secondary reflections;
    wherein said platform is formed as part of a cathode located within a reaction chamber.

26. An apparatus according to claim 23, wherein said processing agent is a chemical vapor within said reaction chamber for depositing a layer on said front side surface.

27. An apparatus according to claim 26, wherein said processing agent is a plasma within said reaction chamber for etching said front side surface.

28. An apparatus according to claim 26, wherein said detecting means generates an interference signal representative of interference fringes of the primary and secondary reflections, and said calculating means calculates said thickness data from said interference signal.

29. An apparatus according claim 26 wherein said light source produces an infrared beam.

30. An apparatus according to claim 28, wherein said calculating means calculates said thickness data based upon changes in the intensity of the interference signal as a function of time.

31. An apparatus according to claim 28, wherein said light source produces a light of varying wavelength, and said calculating means calculates said thickness data based upon changes in the intensity of the interference signal as a function of the wavelength variations of said light.

32. An apparatus for processing a front side of a semiconductor body and providing in-situ process monitoring, comprising:

a processing agent and a support platform for supporting said semiconductor body such that said front side surface thereof can be processed by said processing agent, said support platform having a passageway for transmission of light therethrough;

a light source positioned relative to said body and platform such that said light source can transmit light through said passageway and impinge light onto a back side surface of said semiconductor body, whereby said light is reflected from a back side of a body portion to form a primary reflection and a front side of the body portion to form a secondary reflection;

detector means for detecting said primary and secondary reflections; and calculating means for calculating thickness data for the body portion from said primary and secondary reflections;

wherein said processing agent comprises a polishing pad and slurry, and said platform is formed as a chuck for holding the semiconductor body during polishing of said front side surface.

33. An apparatus according to claim 32, wherein said detecting means generates an interference signal representative of interference fringes of the primary and secondary reflections, and said calculating means calculates said thickness data from said interference signal.

34. An apparatus according to claim 32, wherein said light source produces an infrared beam.

35. An apparatus according to claim 33, wherein said calculating means calculates said thickness data based upon changes in the intensity of the interference signal as a function of time.

36. An apparatus according to claim 33, wherein said light source produces a light of varying wavelength, and said calculating means calculates said thickness data based upon changes in the intensity of the interference signal as a function of the wavelength variations of said light.

* * * * *